US007688034B2

(12) United States Patent
Gabello et al.

(10) Patent No.: US 7,688,034 B2
(45) Date of Patent: Mar. 30, 2010

(54) DEVICE FOR POWERING ELECTRIC OR ELECTRONIC DEVICES OPERATIVELY ASSOCIATED WITH A CIRCUIT BREAKER

(75) Inventors: Antonio Maria Gabello, Bergamo (IT); Paolo Gritti, Albano Sant' Alessandro (IT)

(73) Assignee: ABB S.p.A., Milan (IT)

( * ) Notice: Subject to any disclaimer, the term of this patent is extended or adjusted under 35 U.S.C. 154(b) by 465 days.

(21) Appl. No.: 11/615,441

(22) Filed: Dec. 22, 2006

(65) Prior Publication Data
US 2007/0152648 A1 Jul. 5, 2007

(30) Foreign Application Priority Data
Dec. 29, 2005 (IT) .......................... MI2005A2521

(51) Int. Cl.
*H02J 7/00* (2006.01)
(52) U.S. Cl. ..................... 320/134; 320/135; 320/136
(58) Field of Classification Search .......... 320/134–136
See application file for complete search history.

(56) References Cited
U.S. PATENT DOCUMENTS 6,583,523 B1 * 6/2003 Bhate ........................... 307/86
6,803,766 B2 * 10/2004 Kobayashi et al. ........... 324/434
7,045,990 B2 * 5/2006 Takimoto et al. ............. 320/134
2004/0004463 A1 * 1/2004 Young et al. ................. 320/134
2005/0013076 A1 * 1/2005 Zverev et al. ................. 361/90

* cited by examiner

*Primary Examiner*—Edward Tso
*Assistant Examiner*—Samuel Berhanu
(74) *Attorney, Agent, or Firm*—Connolly Bove Lodge & Hutz LLP (57) ABSTRACT

A device for powering one or more electric/electronic devices operatively associated with a low-voltage circuit breaker takes energy from a power supply line. An electronic regulator receives the energy collected as an input and delivering as an output to the electric/electronic device a power supply voltage (Vout) having a value within a preset range with respect to a reference voltage (VR). The electronic regulator includes an energy storage device chargeable by the energy collected, at the terminals of which a voltage (VCL) is established that is indicative of the power supply voltage (Vout) delivered to the electric/electronic device. A circuit enables/disables the charging of the storage device, and a feedback circuit receives a signal indicative of the voltage (VCL) at the terminals of the storage device and sends a signal to the enabling/disabling circuit to trigger the disabling or enabling of the charging process in order to keep the value of the voltage at the terminals of the storage device within a preset range. The feedback circuit enables the charging phases so as to power the storage device continuously up until the value of the voltage at their terminals comes within the preset range.

18 Claims, 6 Drawing Sheets

DEVICE FOR POWERING ELECTRIC OR ELECTRONIC DEVICES OPERATIVELY ASSOCIATED WITH A CIRCUIT BREAKER

FIELD OF THE INVENTION

The present invention relates to a device for powering one or more electric/electronic device(s) operatively associated with a low-voltage circuit breaker, i.e. for working voltages up to 1 kV. More in particular, the present invention relates to a high-performance power supply device for applications in both alternating current (AC) and direct current (DC).

BACKGROUND OF THE INVENTION

According to the known state of the art, there are low-voltage circuit breakers of various types, depending on the number of poles (i.e. single- or multiple-pole), or depending on the type of operation (e.g. power line circuit breakers, residual current circuit breakers for detecting fault currents to earth, disconnector circuit breakers, and so on). These circuit breakers are generally characterized in that they are associated with electric or electronic devices, such as protection devices that automatically open the circuit breaker in the event of certain conditions (overloads, short circuits or anomalies), signal devices, communication devices, or general accessories such as release devices, spring-loading devices, opening and closing coils, and so on.

In order to function properly, said electric or electronic devices generally need a power source to be provided at a given voltage, with the normal allowable tolerance, that must assure the availability of a power supply PS compatible with the absorption of all the devices, or auxiliary loads (Aux. Loads) involved. Said power supply PS can be delivered by a suitable auxiliary network or batteries, or by specific power supply units capable to take power directly from the network on which the circuit breaker is installed.

Conventionally, there are various types of power supply device for taking energy directly from the network in which the circuit breakers and associated devices are installed.

In a first type, the power supply device takes power from the main power network by means of voltage transformers and/or rectifier bridges, and subsequently regulates said power supply by means of a suitable network of passive and/or discrete elements. In practice, this type of approach is very sturdy, and is capable of providing a generally adequate power supply PS, but it has certain drawbacks. The use of a network of passive and/or discrete elements makes it difficult to guarantee stable power supply conditions for an indefinite period of time, especially in the event of variations in the power supply PS demanded by the auxiliary loads and/or a variability of the phase voltage VPH.

In fact, this solution relies on the use of devices that are always governed at a specific switching frequency fSW, and that are designed to provide a voltage at a value near a preferred reference voltage (VR) with circuits operating on the basis of variations in the so-called duty cycle, i.e. by means of cyclic "on-off" sequences at the switching frequency fSW of the process for charging batteries, such as capacitors. It is common knowledge that the voltage at the terminals of a capacitor depends on its charge according to the formula:

$$V = Q * C$$

where: V is the voltage, expressed in Volts [V], for instance; Q is the charge, expressed in Coulombs [C], for instance; and C is the capacity of the capacitor, expressed in Farads [F], for instance.

Moreover, from the formulas:

$$IC = dQ/dt = CdV/dt$$

or, inversely $$V(t) = \frac{1}{C} \cdot \int_0^t I(t)dt$$

we can see that every time a current ICL circulates in a capacitor CL, the charge Q and consequently the voltage at its terminals change; this happens, for instance, in the case of variations in the absorption of the devices being powered (Aux Loads) or changes in the phase voltage (VPH). The method thus consists in measuring said voltage and cyclically governing series of current pulses at a specific, fixed switching frequency fSW in the capacitor CL until the preferred voltage is restored at its terminals, basically submitting the capacitor to a process of cyclic charging at a fixed switching frequency fSW, and regulating the corresponding duty cycle. More precisely, given that a period of time TSW expressed in seconds physically equates to the inverse of the switching frequency fSW expressed in Hertz, according to the known relation TSW=1/fSW, the process for charging the capacitor can pass from a virtually nil minimum value to a maximum value and back again to a minimum value for every period TSW of the feedback oscillator (Clock & Duty cycle control). In practical terms, when the voltage is lower than the preferred value, the duty cycle acquires high values (i.e. long "on" fractions in the period TSW), whereas when the voltage is too high, the duty cycle takes on the lowest values technically allowable.

It has been demonstrated, however, that the tolerances and physical limits of the components used and consequent phenomena of inertia, hysteresis, transition and thermal drift mean that the alternate switching between "on" and "off" states does not take place at exactly the right time: it is not instantaneous, but occurs in far from negligible fractions of the period TSW. The fact that it is impossible to obtain instantaneous on-off cycles thus sets the lower limit for regulating said duty cycle, which can typically vary effectively enough only between theoretical values coming between 10% and 98%. As a result, the voltage can only be partially limited on the basis of the instantaneous correction of the duty cycle at a given switching frequency fSW, and said regulation cannot be sufficiently accurate.

Outside the narrow operating range, further specific dissipating devices prevent any uncontrolled increase in the voltage at the capacitor's terminals by taking energy from the capacitor and converting it into heat. The large number of passive and discrete components required may also become a critical issue in terms of overall dimensions and costs, however. In practice, it has been demonstrated that the proper operation of the system is protected against the substantial inefficiency of these solutions only for limited dynamics of the phase voltage VPH, roughly between −30% and +100% of the rated value, and it is consequently essential to provide for differently-dimensioned power supply devices to suit the network voltage being used. The use of power supply devices based on this type of approach is consequently scarcely flexible in relation to the network voltage, entailing a consequent increase in production, installation and operating costs. Moreover, the high energy consumption statistically observable due to dissipation induces a considerable heating and greater deterioration of the components, as well as having a far more negative fallout on the energy balance of the main network than would be due to the power supply actually delivered for the auxiliary loads. This poor energy efficiency can give rise to temperatures as high as 140° C. in some of the components involved.

Another drawback of the power supply devices of the previously-described type concerns the so-called startup time TSU, i.e. the time it takes to reach a steady state: being relatively long, this can become a critical issue when it comes to powering a protection device, for instance. Problems can occur, for example, when the circuit breaker is closed in latent short-circuit conditions: in such cases, any delay in the power supply to the protection device tends to be translated into damage to the system and to the circuit breaker.

A second type of power supply device is structured so as to conduct power directly from the sensors used to record the value of the line currents IL. This solution is applicable, for instance, in the case of circuit breakers based on the use of current transformer (CT) sensors, which are suitable for simultaneously providing signals indicative of the value of the current circulating in the phases and powering the electric and electronic devices associated with the circuit breaker.

This second type of solution, as described in the German patent DE19819149 for instance, offers the undeniable advantage of not depending on the phase voltage VPH, but it nonetheless reveals considerable drawbacks. In fact, the power supply voltage VPS that can be delivered by the power supply device is influenced in this case by the value of the line currents IL, which is known to be the most variable parameter in a normal electric circuit. The power conducted from the network consequently cannot be transferred directly to the auxiliary loads in this case either. In much the same way as described above for the first type of device, here again in this second case, phase shifters governed at a constant switching frequency fSW are used with means for dissipating any excess energy so as to compensate for any variations in line current IL and in the power supply PS absorbed by the auxiliary loads. So the drawbacks relating to the inefficiency of the so-called duty cycles at a constant frequency remain much the same.

A further drawback of the power supply devices of the above-described type lies, here again, in the lengthy startup time TSU. In fact, since the initial value of the line currents IL is generally not known, it is impossible to have any real guarantee; at best, the minimum time always ranges from 16 ms to 20 ms and, for the reasons previously explained, that can hardly be considered satisfactory, especially for the purpose of protection devices.

Another limit intrinsic in the use of current transformer sensors lies in that they can only work in networks powered in AC, not in applications in DC.

Figure 1:
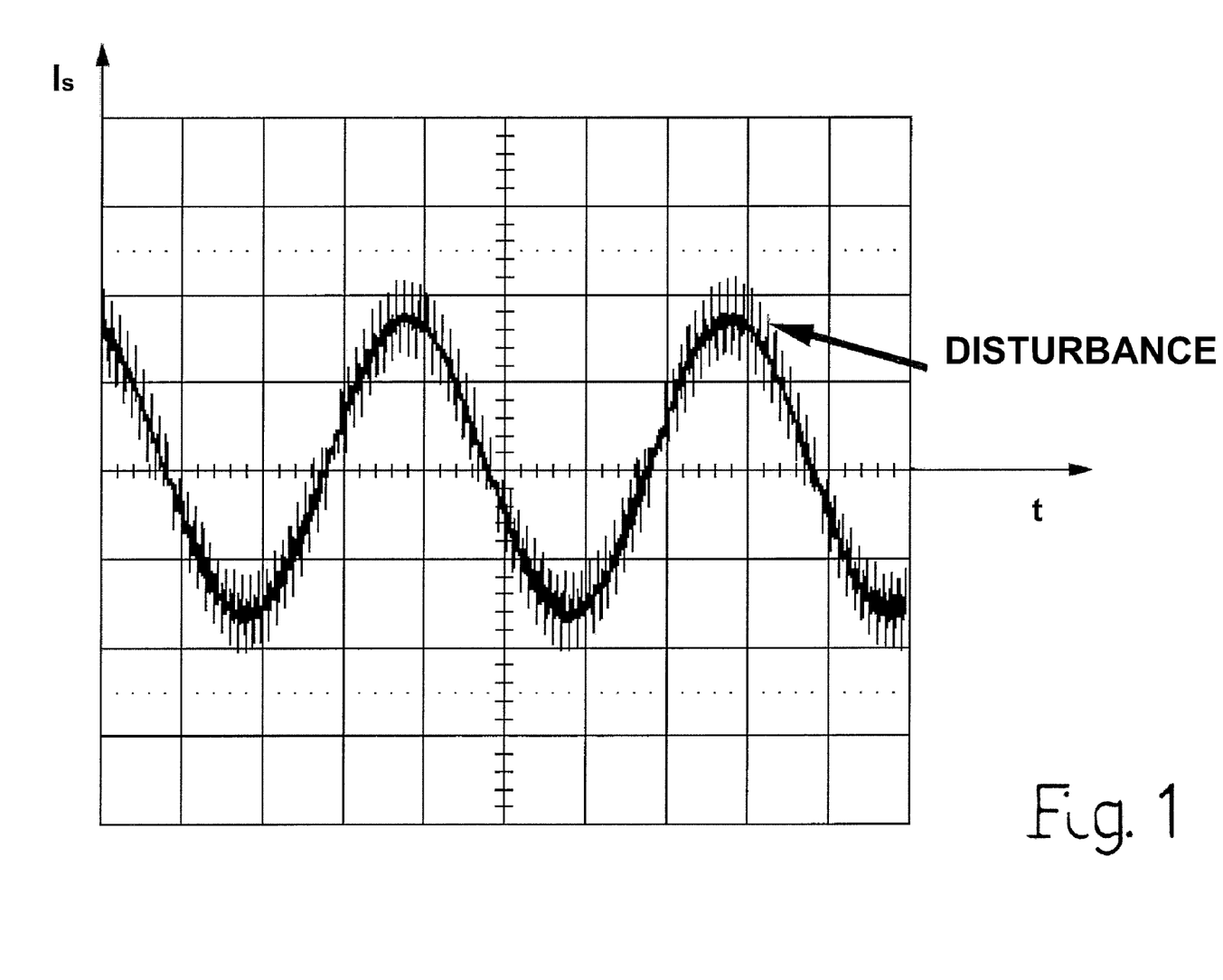
FIG. 1 is an oscillogram illustrating the network disturbance phenomena typical of power supply devices of known type.

Another drawback common to both types of solution described above derives from the fact that the optimal switching frequency fSW of the shifters is around a few thousand Hertz, and therefore considerably higher than the mains frequency (which is normally 50 or 60 Hz), and this circumstance is translated into a considerable risk of electromagnetic disturbance relating, for instance, to the signals controlled by a protection device, but also in the form of unwanted backflows into the main electric network. This phenomenon is illustrated in the oscillogram in FIG. 1.

Another disadvantage common to the two known solutions previously described lies in their low general performance or energy efficiency (which becomes even worse when the dissipators take effect); the energy consumption of the power supplies described may even be sufficient to cause a considerable disruption in the energy balance of the stretch of power network where the circuit breaker is installed with its related devices to power.

SUMMARY OF THE INVENTION

The main technical aim of the present invention is to realize a power supply device for one or more electric or electronic device(s) operatively associated with a low-voltage circuit breaker that enables the previously-described drawbacks to be overcome, and particularly that functions properly for a very wide range of network parameters (VPH or IL) and absorption parameters (PS) of the device(s) being powered. In the context of this technical aim, one object of the present invention is to realize a device for powering one or more electric or electronic device(s) operatively associated with a low-voltage circuit breaker that has a high energy efficiency and drastically reduces the situations in which it is necessary to passively dissipate any excess power.

Another object of the present invention is to realize a power supply device for one or more electric or electronic device(s) operatively associated with a low-voltage circuit breaker that enables a reduction in overheating phenomena, thereby reducing the exposure of the components to a rapid consequent deterioration. Another object of the present invention is to realize a power supply device for one or more electric or electronic device(s) operatively associated with a low-voltage circuit breaker that does not generate significant disturbances of electromagnetic type. Yet another object of the present invention is to realize a power supply device for one or more electric or electronic device(s) operatively associated with a low-voltage circuit breaker that has limited overall dimensions and is reliable and easy to manufacture at relatively low costs.

Thus the present invention relates to a power supply device for powering one or more electric/electronic devices operatively associated with a low-voltage circuit breaker, comprising means for taking energy from a power supply line, electronic regulating means that receive the energy collected by said means for taking power as input and deliver as output to the electric/electronic devices a power supply voltage (Vout) having a value within a preset range with respect to a reference voltage (VR); in the device according to the invention said electronic regulating means comprise:

energy storage means, chargeable by means of said energy collected by said means for taking energy, the terminals of which carry a voltage (VCL) that is indicative of the power supply voltage (Vout) delivered to the electric/electronic device;

an circuit for enabling/disabling the charging of the storage means;

a feedback circuit that receives an input signal indicative of the voltage (VCL) at the terminals of the storage means, and that sends a command signal to the enabling/disabling circuit such that the latter disables or enables the charging process in order to keep the voltage at the terminals of the storage means within said preset range, said feedback circuit enabling the charging phase so as to power the storage means continuously up until the voltage at their terminals is within said preset range To be precise, the definition of an electric/electronic device associated with a circuit breaker is used to mean either a type of structurally separate device coupled in practice as a separate body to the circuit breaker so as to equip the latter with functions for which the former has been conceived, or a device developed as an integral part and incorporated directly in the physical structure of the circuit breaker, or even a device that is realized by means of a combination of the two above-mentioned options, i.e. comprising several parts, some of which may be already integrated in the circuit breaker, which are then operatively connected to one another in practical applications so as to serve the required purpose.

For a better understanding of the present invention, reference is made to the accompanying drawings and to the detailed description hereinafter, in which preferred but non-limitative embodiments of the device according to the present invention are illustrated.

DESCRIPTION OF THE PREFERRED EMBODIMENTS

Figure 2:
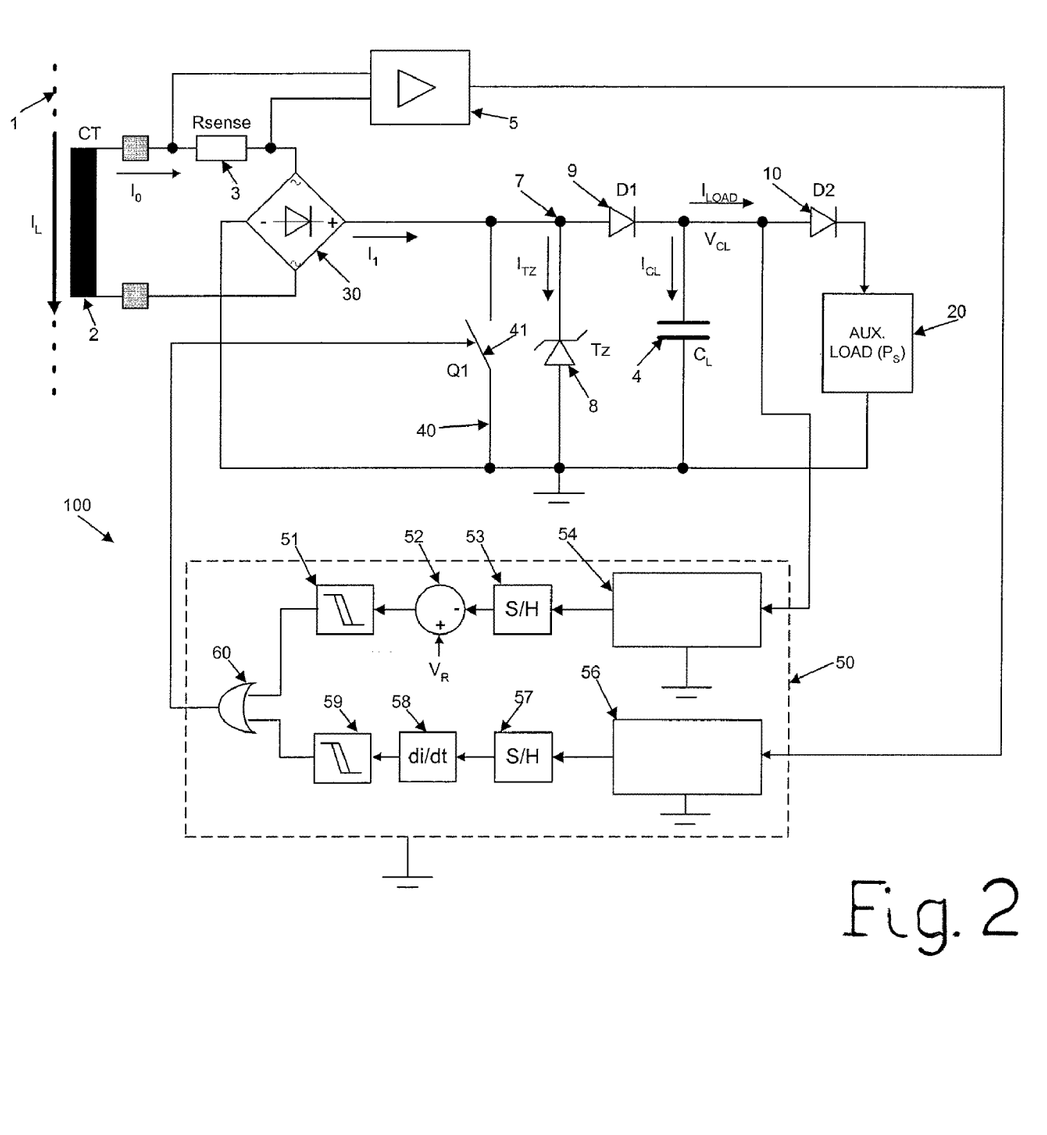
FIG. 2 schematically illustrates a first embodiment of the power supply device according to the invention.

FIG. 2 schematically illustrates a first embodiment of the power supply device according to the invention, indicated globally by the reference numeral 100, which comprises: means suitable for taking power from a power supply line 1; electronic regulating means that receive the power collected by the means for taking power 1, preferably in the form of a current, as input and that deliver a supply voltage (Vout) with a value coming within a range established in relation to a preset reference voltage (VR) to the electric/electronic device(s) being powered, schematically indicated by the reference numeral 20.

To facilitate the description, only a single device 20 to power is illustrated in the figures, although several electric/electronic devices 20 may clearly be powered simultaneously by the device according to the invention.

Moreover, the figures only illustrate a single conductor 1 from the power supply line; this is on the understanding that the content of the following description can be applied equally to any number of power line conductors, by suitably adapting or configuring the conductors.

In the example of an embodiment shown in FIG. 2, the means for taking power are configured so as to collect power from the line in the form of a current, and they comprise, for instance, a current transformer (CT) 2, which directly delivers a current signal Io as output; said current signal is delivered to the electronic regulating means according to methods and for purposes that will be explained in more detail later on.

Figure 3:
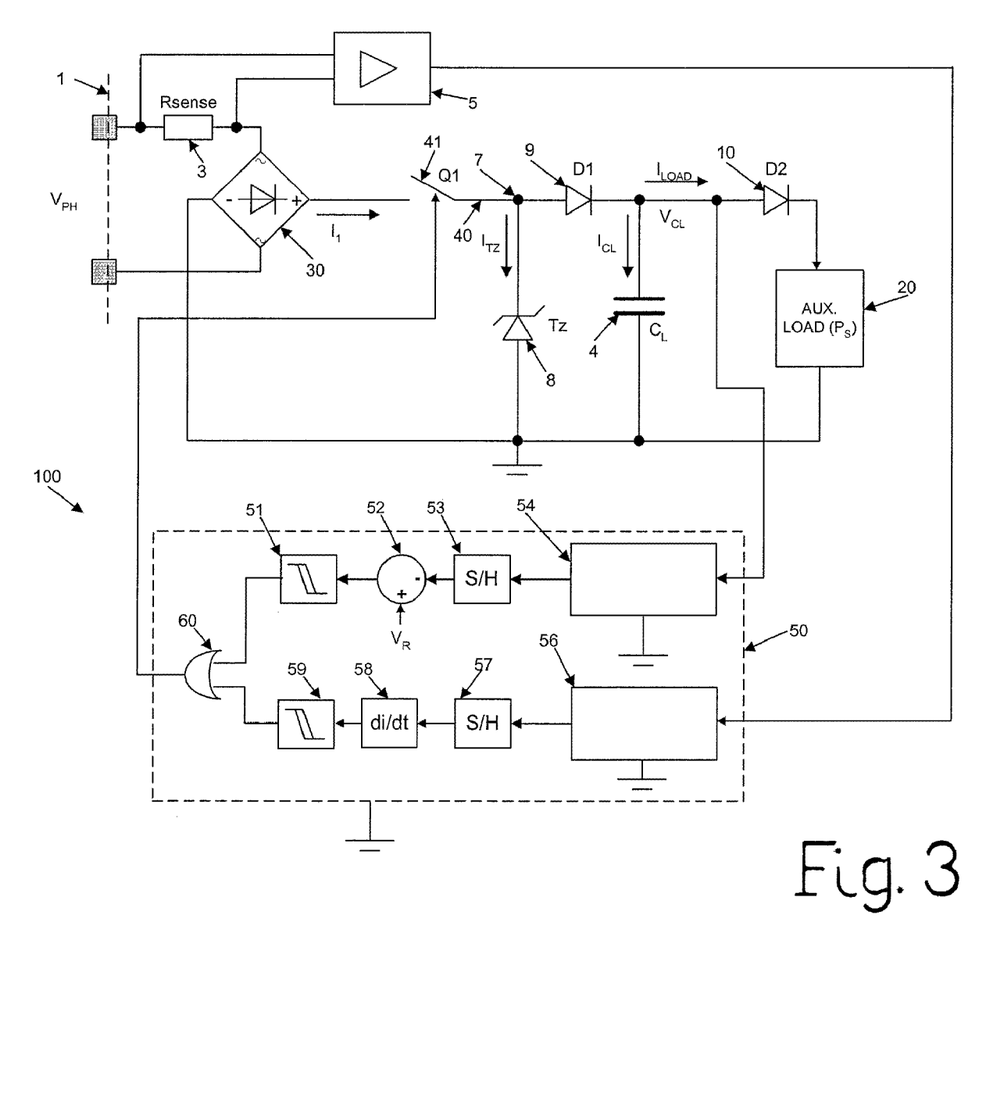
FIG. 3 schematically illustrates a second embodiment of the power supply device according to the invention.

Alternatively, in the embodiment of FIG. 3, the means for taking power can be designed so as to collect energy in the form of a voltage signal (phase voltage VPH) from the power line 1, either directly, by means of connection terminals coupled directly to the line 1, for instance, or indirectly, by inserting a voltage transformer for the purpose of introducing a convenient transformation ratio and/or enable a galvanic uncoupling of the line and the power supply device.

This embodiment preferably involves the use of a suitable resistor 3 for transforming the voltage signal; in such a way, the signal with an energy content to be delivered to the electronic regulating means is represented, here again, by a current signal.

Irrespective of, or in addition to the above-described and other functionalities and objects that will become more clear later on, provision may in any case be made for the use of a resistor in the device 100, e.g. by means of at least one stretch of electric conductor element with an electric resistance (RSENSE) of a previously-established value between two pre-set reference points, e.g. between its two ends. For instance, the resistor 3 may be a length of copper bar suitably loaded with controlled proportions of other chemical elements, such as Ni 6%. According to a variant of the invention, where requested or necessary, the resistor—and the value of the resistance at its ends, in particular—can be suitably sized so as to omit the use of the transformer; in this case, the resistor is positioned in series along the line conductor 1 and the line current passes through it, so that it functions as a power takeoff.

The power supply device 100 can advantageously be used, moreover, with both DC and AC power lines. In the latter case, provision is made for the use of rectifying means 30, such as a diode bridge, as illustrated in the figures, that enable—as in the embodiment of FIG. 3—a not necessarily constant direct current I1 to be obtained that has a trend substantially equating to the modulus of the current I0. More precisely, the rectifying means 30 receive a current I0 with a generally alternating trend as input and as output they generate a rectified current I1, indicative of I0, with a substantially positive double half-wave trend. As mentioned earlier, in the case of the power being collected in the form of a voltage, said voltage can be converted into current by means of a resistor 3.

In the device according to the invention, the electronic regulation means advantageously comprise:

energy storage means, comprising for instance at least one capacitor 4, chargeable with the power delivered by the means for taking power, at the terminals of which a voltage (VCL) is established that is indicative of the supply voltage (Vout) delivered to the electric/electronic device 20 being powered;

a circuit 40 for enabling/disabling the storage means charging process;

a feedback circuit 50, whose input is a signal indicative of the voltage (VCL) at the terminals of the storage means and whose output is a command signal to the enabling/disabling circuit 40 suitable for disabling or enabling the charging process in order to keep the value of the voltage (VCL) at the terminals of the storage means within the preset range. To be more specific, the feedback circuit enables the continuous charging of the power storage means up until the voltage value at their terminals (VCL) is within the preset range, in particular until said voltage value reaches the upper limit of the preset range.

The charging of the storage means is advantageously achieved continuously by means of a choking of the waveform of the current delivered to the electronic regulating means, i.e. the feedback circuit 50 enables the charging so as to open a window and continuously and fully exploit the power delivered, regardless of its parameters. In particular, if the incoming power is in the form of a current, charging takes place irrespective of its intensity or waveform; in other words, the waveform of the current received as input is fully exploited and then cut off when an adequate charge has been reached, corresponding to the upper limit of the preset voltage range.

According to a particularly preferred embodiment, the instantaneous feedback regulation of the charging of the storage means, and particularly of the capacitor 4, is achieved according to a non-linear, more preferably a "switching" or ON/OFF, modality that is unrelated to any control frequency.

In the embodiments illustrated in the figures, the feedback circuit 50 comprises means of comparison, e.g. a comparator 51, adding means 52, in the form of an adding node, and sampling and holding means 53, e.g. comprising a clock and a memory; said means 51-53 may be, for example, integrated in a microcontroller. Moreover, provision is preferably made for the use of a low pass filter 54, consisting, for example, of a common RC circuit.

The enabling/disabling circuit 40 advantageously comprises at least one semiconductor electronic device 41 which can be connected in parallel to the energy storage means 4, as illustrated in FIG. 2, or in series as illustrated in FIG. 3; the semiconductor electronic device 41 may preferably be in the form, for instance, of one or more "MOSFET", "BJT" or "IGBT" transistors or the like.

The electronic regulating means also comprise a first diode 9 which is placed upstream from the storage means so as to prevent their undue discharge upstream and, if necessary, a second diode 10 is placed downstream from the storage means to prevent energy backflows from the device(s) 20 being powered.

According to a particularly preferred embodiment, the power supply device according to the invention comprises a plurality of protection means suitable for reacting to the occurrence of anomalous operating conditions due, for instance, to conditions occurring in the power supply line 1 from which the power supply device collects energy, or caused by the device(s) being powered, or due to operating conditions intrinsic in the power supply device.

These protection means comprise limiting means (Tz) for cutting off the voltage to the terminals of the storage means when it exceeds a preset safety threshold; as illustrated in FIGS. 2 and 3, these limiting means are connected to a first node 7 and comprise, for instance, at least one rapid-acting power zener diode 8 for containing any temporary voltage peaks occurring at the terminals of the capacitor 4 by thermal dissipation.

Figure 4:
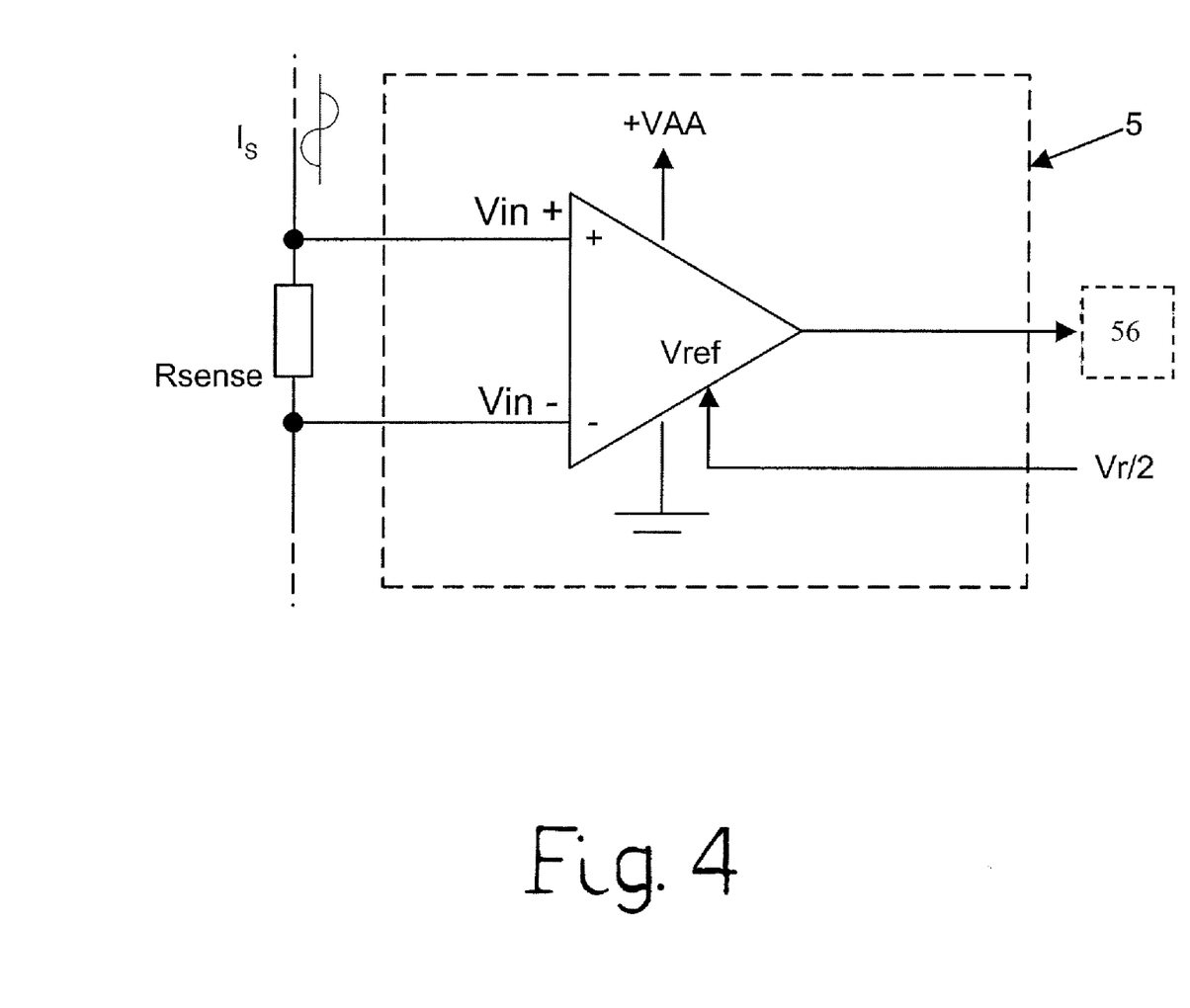
FIG. 4 schematically illustrates a safeguard device used in the power supply device according to the invention.

Said protection means advantageously also comprise at least one resistor (Rsense), preferably coinciding with the previously-described resistor 3, suitable for being operatively coupled to the power supply line. In particular, the resistor 3 can be coupled to the line 1 so that a current indicative of the current circulating in said power supply line 1 passes through the resistor, thereby providing a voltage at the terminals of the resistor 3 that is indicative of the current in the line 1. A signal indicating the voltage at the terminals of the resistor 3 can be delivered either directly to the feedback circuit 50, or to a circuit safeguard device, illustrated schematically in FIG. 4 with the reference number 5, connected in parallel to the resistor 3, and operatively coupled to the feedback circuit 50 for purposes explained in more detail later on. As illustrated in FIG. 4, for instance, the safeguard device 5 may consist of a differential amplifier.

According to another variant of the invention, provision can be made in the device 100 for the use of a resistor 3 (Rsense) operatively coupled to the power supply line so that a voltage is established at its terminals that is indicative of the phase voltage of said power supply line; a signal corresponding to said voltage is consequently delivered to the circuit safeguard device 5 for purposes that will be further explained below.

In practice, in operating conditions such as in the embodiment of FIG. 2, downstream from the means for taking power there is a current I1 that coincides, in normal operating conditions, with the current I2 passing through the diode 9. The current I2 is divided at a second node 11 into currents ICL and ILOAD, which respectively pass through the capacitor 4 (CL) and the device(s) being powered 20, with which the diode 10, where applicable, is connected in series. The current ICL charges the capacitor 4, at the terminals of which there is a voltage VCL; said voltage VCL is indicative of, and substantially coincides with the supply voltage (Vout) delivered to the device 20; in fact, the voltage drop at the terminals of the second diode 10, if any, can normally be considered negligible.

The signal indicative of the instantaneous voltage VCL at the terminals of the capacitor 4 is received as input by the feedback circuit 40; more precisely, said signal passes through the low pass filter 54, giving rise to a value VCL1 that is indicative of VCL but purged of any background noise or harmonics. The signal is then made compatible with the comparator 51 by the sampling and holding means 53, which sample and record the signals received, and by the adding means 52, which calculate, for instance, the difference between the preset reference value VR and the value of VCL1, generating a signal $\Delta=VR-VCL1$. This is done, for instance, by attributing a positive sign to VR and a negative sign to VCL1. Finally, the comparator 51 receives the signal $\Delta$ as input and produces a corresponding enabling/disabling signal that controls the enabling/disabling circuit 40.

Going into more detail, in the embodiment of FIG. 2, the semiconductor electronic device 41 moves in the closed state for values of $\Delta \leqq 0-\epsilon 1$, closing a short circuit at the terminals of the limiting means and thus shunting the incoming current and consequently interrupting the charging of the capacitor 4, thereby restoring it to an acceptable condition within the working range; for values of $\Delta \geqq 0+\epsilon 2$, the device 41 moves in the open state, so as to enable the passage of the charging current towards the capacitor 4.

Thus, the capacitor charging process is enabled for values of VCL1<VR, i.e. up to the preset threshold, whereas for values of VCL1>VR, beyond the preset threshold, the feedback circuit 40 allows the current ILOAD to be supplied momentarily by the capacitor 4 alone so that the consequent discharging process restores the voltage value VCL to the desired value VR. Of course, the choice of the "+" or "−" and of the "<" or ">" signs is up to the user, providing the general logic is preserved so to enable charging to coincide with reductions in VCL1 and charging to be suspended when VCL1 becomes excessive. The threshold values $\epsilon 1$ and $\epsilon 2$ are chosen to suit the characteristics of the components being used and the tolerance that the user wishes to obtain for the voltage value of the power being delivered. In particular, the threshold values $\epsilon 1$ and $\epsilon 2$ taken for reference for the feedback process must be established so that the voltage generated by the power supply device is maintained within the effective tolerance required, characterized for instance by the pair of tolerance values $\epsilon 10$ and $\epsilon 20$ corresponding to the upper limit value $VR+\epsilon 10$ and lower limit value $VR-\epsilon 20$. The pair of reference values F1 and $\epsilon 2$ will normally be more restrictive than the pair of tolerance values $\epsilon 10$ and $\epsilon 20$, to account for normal inertia phenomena. The consistency between the chosen tolerance values $\epsilon 10$ and $\epsilon 20$ and the corresponding threshold values $\epsilon 1$ and $\epsilon 2$ can be established both analytically and empirically.

In the embodiment of FIG. 3, the device 41 works according to an alternative type of installation solution, just as valid as the one described in the embodiment in FIG. 2, wherein the device 41 closes to enable the charging of the storage means and opens to interrupt said process.

Alternatively, the feedback circuit 40 according to the configuration of FIG. 2 (device 41 connected in parallel) can be used in the embodiment of FIG. 3 as well, suitably calibrating the resistance of the resistor (RSENSE).

The device 100 according to the invention is preferably configured so as to have a value VR that is substantially constant but can be pre-regulated, subject to the electrical parameters of the electric and electronic components being used, so as to make it as versatile as possible; using said regulation, the limits of the tolerance defined by the two thresholds $\epsilon 1$ and $\epsilon 2$ can remain virtually unchanged.

In normal operating conditions, there is no current passing through the limiting means (Tz) 8 connected to the node 7; it is only occasionally, e.g. in the event of sudden variations in the phase voltage (VPH) on the line 1, or sudden variations in the absorption by the device(s) 20, that a current ITZ other than zero passes through the limiting means. Given that the current ICL tends to charge the storage means as quickly as possible, the electronic limiting means TZ establish a safety limit on any pulsing of the voltage VCL, i.e. the voltage delivered to the device(s) 20.

The parameters for the limiting means TZ are advantageously calculated so as to achieve a cutoff at a voltage VTZ, which is a value slightly higher than the required VR; these parameters are calculated so that the VTZ slightly exceeds the higher tolerance limit for the normal operation of the device. For instance, for VR=12V±10% (operating margin), limiting means can be used that cut off the voltage VTZ at a value of 13.4V. A correct setting for VTZ (safety margin) enables the proper operation of the device 100 to be entrusted routinely to the feedback circuit 40, and the intervention of the limiting means TZ to be prompted only in exceptional conditions. This means that, in the power supply device according to the present intervention, the voltage VCL is maintained at a virtually constant value, which is never higher than a preset value VTZ, despite any sudden variations in the mains voltage or in the absorption by the auxiliary loads, such as may occur on startup, for instance. This is particularly advantageous, since it avoids the risk of damage to said auxiliary circuits connected downstream from the power supply device.

In turn, the safeguard device 5 receives a signal input indicative of the voltage at the terminals of the resistor 3 (which is also indicative of the current Io circulating in the conductor on the line 1) and sends a corresponding conditioned and/or uncoupled signal to the feedback circuit 50 that is indicative of the current circulating in the power supply line 1. The feedback circuit 50 processes the signal, e.g. by means of a filter 56, sampling and holding means 57, a shunt 58, and a comparator 59, comparing it with a further preset threshold value: when the value of said input signal indicative of the current circulating in the power supply line is higher than the preset threshold, the circuit 50 sends the enabling/disabling circuit 40 a corresponding signal to disable the charging process.

The operation is similar in the case of the circuit 50 receiving the signal indicative of the voltage at the terminals of the resistor 3 directly (i.e. without passing through the cutout 5).

The element 60 illustrated in FIGS. 2 and 3 is a logical OR operator, which receives signals from the comparators 51 or 59 and then makes a corresponding command signal available to the circuit 40.

In the solution shown in FIG. 3, the safeguard device 5 functions according to similar principles, but the voltage at the terminals of the resistor 3, which is indicative of the current Io circulating therein, is substantially correlated in this case with the phase voltage VPH.

This enables any charging of the storage means 4 to be anticipated in the event, for instance, of a rapid rise in the current I0, thereby further improving the stability and performance of any embodiment of the present invention and further restricting the generation of electromagnetic disturbances towards the environment.

Likewise, if there is a voltage indicative of the phase voltage of the line 1 at the terminals of the resistor 3, the circuit safeguard device 5 receives an input signal that is indicative of said voltage at the terminals of the resistor 3 and delivers a corresponding conditioned and/or uncoupled signal to the feedback circuit 50 that is indicative of the phase voltage of the power supply line 1; the feedback circuit 50 processes said signal in much the same way as explained previously, and sends a disabling signal to the enabling/disabling circuit 40 if the value of the input signal indicative of the power supply line's phase voltage exceeds the preset threshold, thereby anticipating its reaction to voltage peaks on the line.

Figure 5:
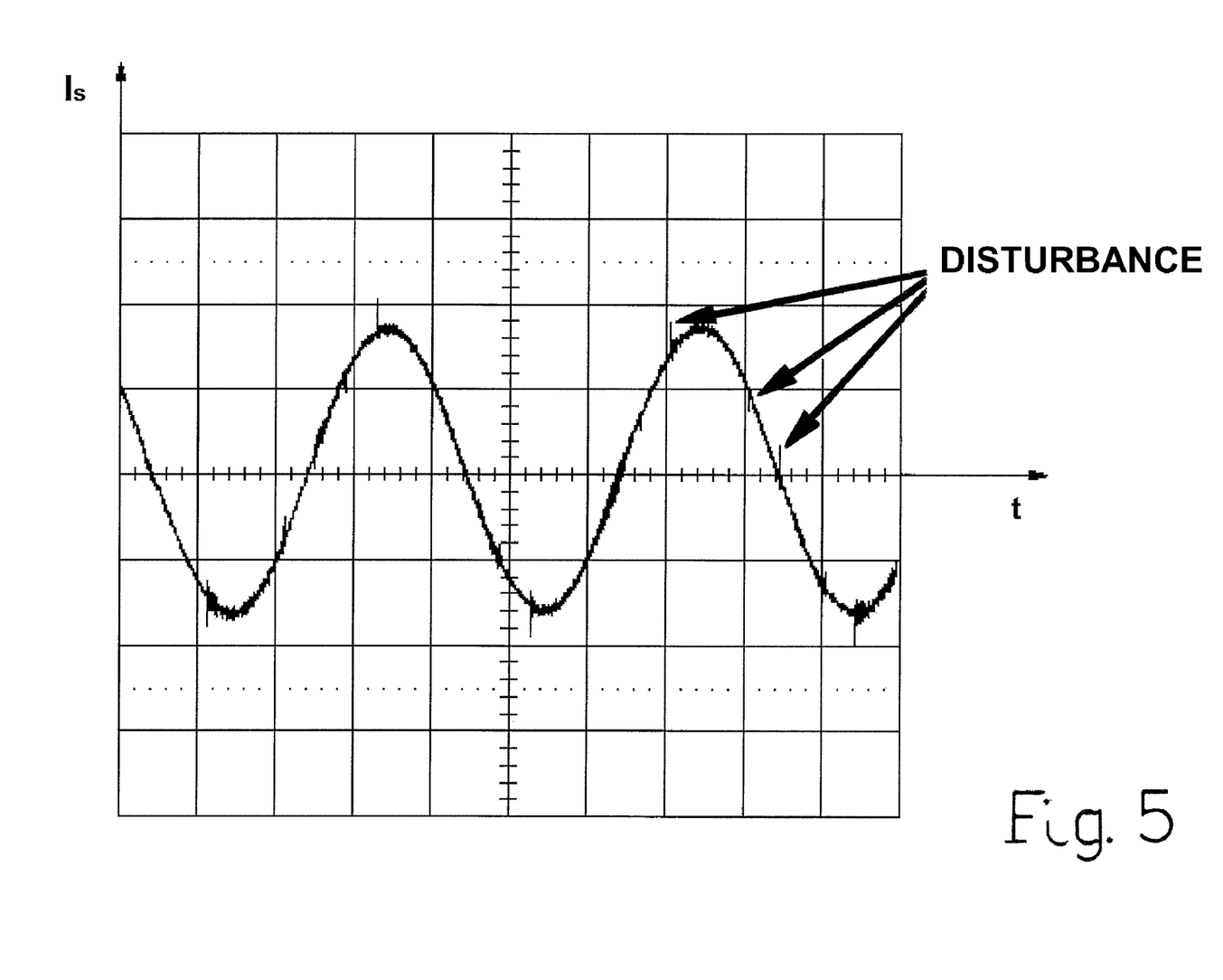
FIG. 5 shows an oscillogram that illustrates the drastic reduction in network disturbance phenomena (by comparison with the situation illustrated in FIG. 1) deriving from the use of the power supply device according to any embodiment of the present invention.

It has been demonstrated experimentally that the power supply device according to the invention fully satisfies the previously-stated technical aims and objects, affording a significant number of advantages and technical-functional improvements over the known state of the art. In fact, by achieving an energetic, non-linear, and particularly ON/OFF type of regulation of the charging process, i.e. by opening/closing the energy input window, the device 100 enables the available energy to be exploited only in the required measure and for the time it takes to reach the working conditions, assuring an optimal operation for a very wide range of the parameters of the line from which the energy is taken, and of the absorption parameters of the devices being powered, in a manner substantially independent of any specific controlling frequency. As a result, the need for heat dissipation as in the known power supply devices, and particularly in those of the first type previously discussed, is limited exclusively to the occurrence of occasional, not to say exceptional operating conditions, with a consequent reduction in the heating and wear and tear of the components being used, and a longer working life and greater reliability of the power supply device. Moreover, the fact that the regulation is no longer necessarily achieved by means of successive pulses at a specific frequency, but by making optimal use of the instantaneous energy availability, reduces or even eliminates the related electromagnetic disturbance, as shown globally in the oscillogram of FIG. 5, and in more detail in the set of oscillograms shown in FIG. 6.

Figure 6:
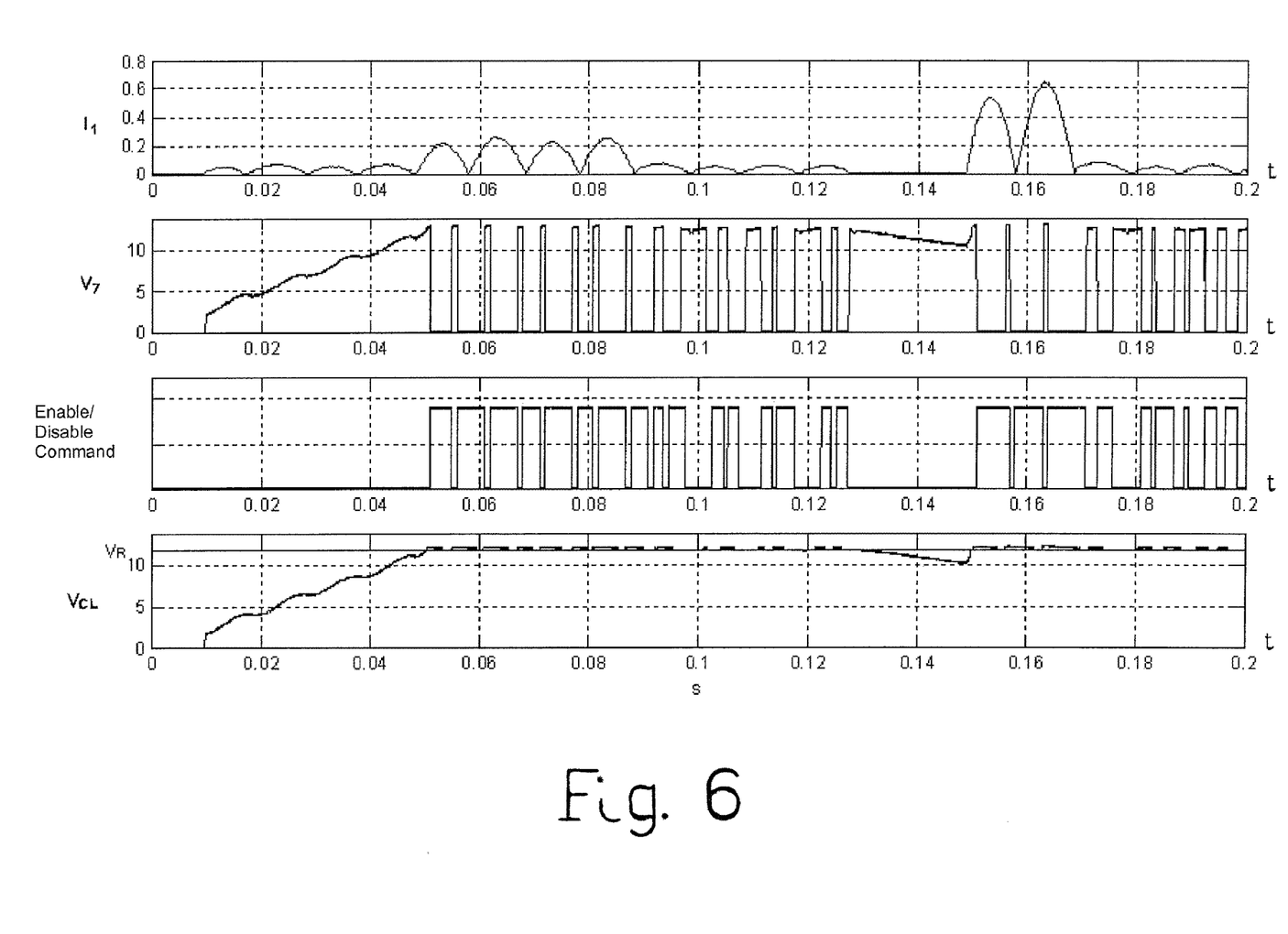
FIG. 6 shows various oscillograms representing some typical operating parameters for a power supply device according to the invention, on the assumption of a constant absorption by the device being powered.

Going into more detail, FIG. 6 shows the trend of the current I1 (uncontrollable parameter) of the voltage at the node 7 (V7), which is indicative of the subsequent charging processes, the status of the device 41 (off or on), i.e. in the case of enabling/disabling commands relating to the embodiment of FIG. 2, wherein the open position corresponds to the charge-enabling phase, and finally the trend of VCL (i.e. in practical terms, the voltage generated by the device 100) with respect to the constant value of the reference voltage VR.

To be more specific, the diagram showing the trend of V7 clearly shows that, even with a modest availability of energy from the network (e.g. coinciding with the time 0.14, where I1 is near zero), the charging process can be sustained without interruption for lengthy periods of time, whereas in the event of network energy peaks (e.g. coinciding with the time 0.16), the single charging phases have a much more limited duration and are less frequent.

A particular advantage that becomes immediately evident consists in being able to have an indefinite variability in the duration of the periods of charging and no charging on the basis of the actual energy demand from the loads being powered and the actual energy availability from the network, giving rise to a virtually infinite number of possible combinations. Equally significant is the exceptional good holding of the voltage VCL within the desired limits, even in the event of sudden variations in the availability of the energy from the network.

The device 100 also has a limited transient time (or startup time TSU), rapidly reaching a steady state.

Last, but certainly not least important, the device according to the present invention can be used coupled to any low-voltage circuit breaker and, as previously stated, it can be coupled either to a DC or to an AC low-voltage power supply line in a variety of electrical systems, and particularly those for industrial applications. A further object of the present invention consequently comprises in a low-voltage electrical system and a low-voltage circuit breaker, particularly for industrial applications, each characterized in that they comprise a power supply device 100 according to the above description and as claimed.

We claim:

1. A power supply device for powering one or more electric/electronic devices operatively associated with a low-voltage circuit breaker, comprising means for taking energy from a power supply line, electronic regulating means that receive the energy collected by said means for taking power as input and deliver as output to the electric/electronic devices a power supply voltage (Vout) having a value within a preset range with respect to a reference voltage (VR), wherein said electronic regulating means comprise:
    energy storage means, chargeable by means of said energy collected by said means for taking energy, the terminals of which carry a voltage (VCL) that is indicative of the power supply voltage (Vout) delivered to the electric/electronic device;
    a circuit for enabling/disabling the charging of the storage means;
    a feedback circuit that receives an input signal indicative of the voltage (VCL) at the terminals of the storage means, and that sends a command signal to the enabling/disabling circuit such that the latter enables or disables the charging process in order to keep the voltage at the terminals of the storage means within said preset range, said feedback circuit enabling the charging phase so as to power the storage means continuously up until the voltage at the terminals of the storage means is within said preset range;
    protection means suitable for taking action in the event of the occurrence of anomalous operating conditions;
wherein said protection means comprise at least one resistor (Rsense) for coupling operatively with said power supply line, a current indicative of the current circulating in said power supply line passing through said resistor, thereby providing a voltage at the terminals of said resistor, which is indicative of the current in said power supply line, a signal indicating the voltage at the terminals of said resistor being delivered either directly to said feedback circuit or to a circuit safeguard device.

2. Power supply device according to claim 1, wherein said energy collected by the means for taking energy is delivered to said electronic regulating means in the form of a current and said charging of the storage means is achieved continuously by means of a choking of the waveform of said current input to the electronic regulating means.

3. Power supply device according to claim 2, wherein said charging of said storage means is achieved according to a nonlinear feedback regulating mode.

4. Power supply device according to claim 3, wherein said charging of said storage means is achieved according to a switching feedback regulating mode.

5. Power supply device according to claim 1, wherein said feedback circuit comprises means of comparison that receive as input a signal indicative of the difference (D) between the value of the reference voltage (VR) and a value indicative of the voltage (VCL) at the terminals of the storage means, and that send a corresponding enabling/disabling command signal to said enabling/disabling circuit.

6. Power supply device according to claim 5, wherein said feedback circuit comprises adding means that receive as input a signal indicative of the voltage (VCL) at the terminals of the storage means and a signal indicative of the reference voltage (VR), and that send said signal indicative of the difference between them (D) as output to said means of comparison.

7. Power supply device according to claim 6, wherein said feedback circuit comprises a low pass filter that receives said signal indicative of the voltage (VCL) at the terminals of the storage means as input and purges of any harmonics, and sampling and holding means that sample and record the signal received from the low pass filter and send it to said adding means.

8. Power supply device according to claim 1, wherein said enabling/disabling circuit comprises at least one semiconductor electronic device.

9. Power supply device according to claim 8, wherein said at least one semiconductor electronic device is connected in parallel to said energy storage means.

10. Power supply device according to claim 8, wherein said at least one semiconductor electronic device is connected in series to said energy storage means.

11. Power supply device according to claim 1, comprising at least one resistor (Rsense) installed in series, through which the current circulating in said electric line passes.

12. Power supply device according to claim 1, wherein said protection means comprise at least one resistor (Rsense) for coupling operatively with the power supply line so that a current indicative of the current circulating therein passes through the resistor and a signal indicative of the voltage thus established at the terminals of said resistor (Rsense) is delivered directly to said feedback circuit.

13. Power supply device according to claim 1, wherein said protection means comprise at least one resistor (Rsense) for coupling operatively with the power supply line so that a current indicative of the current circulating therein passes through the resistor; and a circuit safeguard device that receives a signal indicative of the voltage at the terminals of said resistor as input and sends a corresponding conditioned and/or uncoupled signal to said feedback circuit that is indicative of the current circulating in said power supply line, said feedback circuit then sending a disabling signal to said enabling/disabling circuit whenever the value of said signal it receives (which is indicative of the current circulating in the power supply line) exceeds a preset threshold.

14. Power supply device according to claim 1, wherein said protection means comprise at least one resistor (Rsense) for coupling operatively with said power supply line, at the terminals of which a voltage is established that is indicative of the phase voltage of the power supply line; and a circuit safeguard device that receives a signal indicative of the voltage at the resistor's terminals and sends to said feedback circuit a corresponding conditioned and/or uncoupled signal indicative of the phase voltage of the power supply line, wherein said feedback circuit sends a disabling signal to said enabling/disabling circuit if the value of said signal indicative of the phase voltage of the power supply line exceeds a preset threshold.

15. Power supply device according to claim 1, wherein said protection means comprise limiting means for cutting off the voltage to the terminals of the storage means whenever it exceeds a preset safety threshold.

16. Power supply device according to claim 1, wherein said electronic regulating means comprise a first diode installed upstream from the storage means to prevent them from being discharged upstream, and a second diode installed downstream from said storage means to prevent energy backflows from the electric/electronic device(s).

17. Low-voltage circuit breaker comprising a power supply device according to claim 1.

18. Low-voltage AC/DC electric system comprising a power supply device according to claim 1.

* * * * *